United States Patent Office 3,388,607
Patented June 18, 1968

---

3,388,607
FRICTION WHEEL TRANSMISSION
Paul Stöber and Wilhelm Stöber, both of
Kieselbronnerstr. 12, Pforzheim, Germany
Filed Oct. 29, 1965, Ser. No. 505,648
Claims priority, application Germany, Sept. 11, 1965,
St 24,384
8 Claims. (Cl. 74—191)

ABSTRACT OF THE DISCLOSURE

A friction transmission having an input shaft axially fixed and rotatably mounted in a housing, an intermediate shaft axially movable and rotatably mounted in the housing and an output shaft axially nonmovable and rotatably mounted in the housing, coupled to the intermediate shaft, a friction cone being secured to the input shaft and engaging a conical friction ring detachably secured to the intermediate shaft, a prestressed compression spring means being mounted in the housing to urge the friction ring against the cone and adapted to extend in response to wear of the friction ring, and stop means mounted in the housing and arranged to limit the extension of the spring means to a value corresponding to the maximum allowable axial wear of the friction ring, and to hold the spring means in the position of limited extension.

---

This invention relates to a friction wheel transmission, which is connected between a motor shaft and a final output shaft and comprises means including a claw coupling and a spring-loaded stub shaft for a load-dependent control of the pressure applied, said stub shaft carrying a friction ring, a friction cone being rigidly mounted on the motor shaft.

Friction transmissions of this kind are known. It is usual to provide a compression spring acting on the friction ring in order to maintain the pressure applied or contact between the friction cone and the friction ring. As the friction ring is subjected to considerable wear and must be easily replaceable, the transmission housing consists of two parts, as a rule. The stub shaft is under high spring pressure and is floatingly mounted to enable its axial movement, and when such a housing is opened this stub shaft is suddenly urged outwardly. When the housing is closed, the spring pressure must be overcome by manual force or with the aid of tools until the housing screws have been re-engaged. In most cases, friction rings are replaced by the user rather than by the manufacturer and the user has no special tools for this purpose.

According to the invention, this disadvantage is avoided in that the extension of the built-in compression spring is limited by a stop to the extent required for a satisfactory function. In friction wheel transmissions in which the output shaft provided with the claw coupling has an extension, which extends into the hollow stub shaft, and the spring which loads the hollow stub shaft is mounted in said extension, the extension of the compression spring acting on a pointed pressure applying member may be limited with the aid of said member by a stop, particularly with the aid of a conical shoulder engaging a spring ring which is inserted in an undercut groove, or the extension of the compression spring which acts on a pointed pressure applying member provided with a shank may be limited by means of a retaining screw or the like which is mounted at the shank end.

Figure 1:
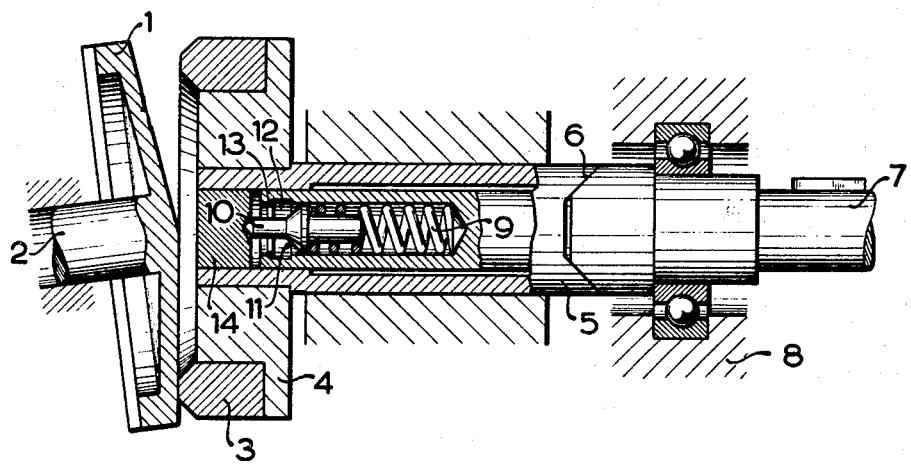
Figure 2:
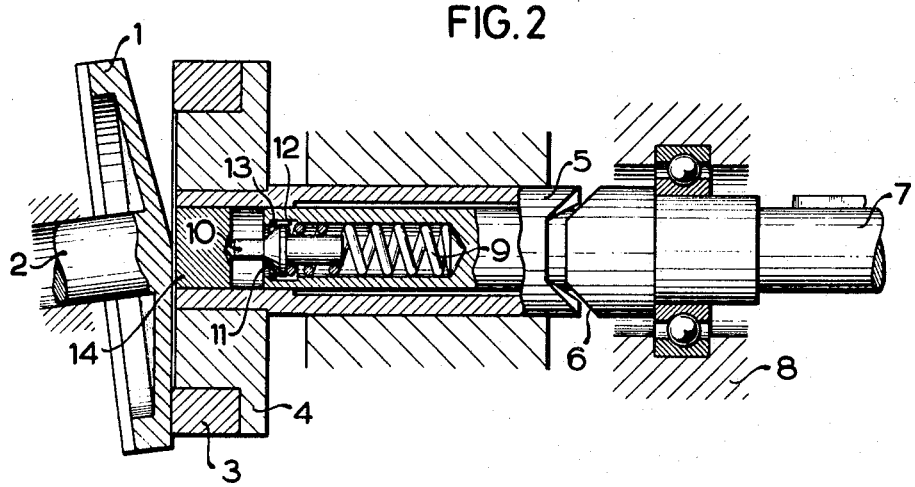
Figure 1A:
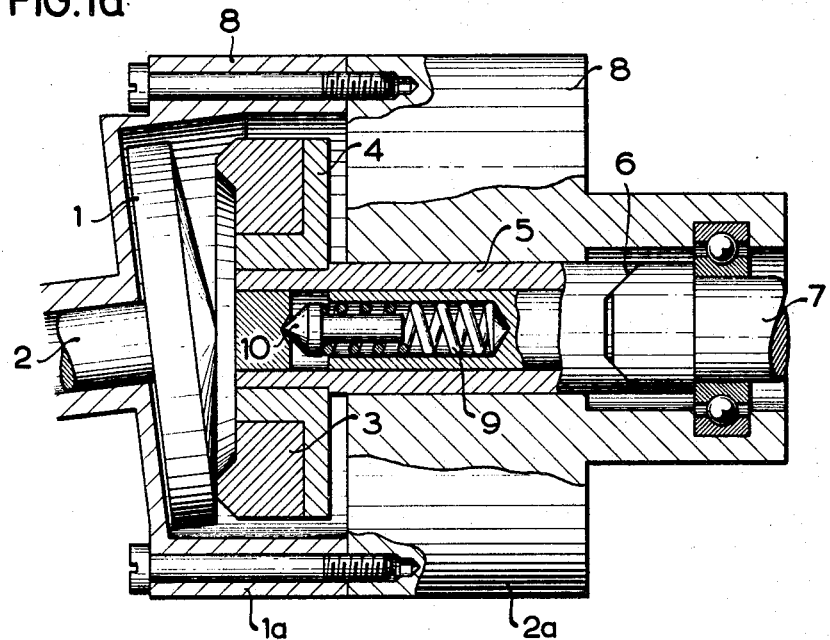
Figure 2A:
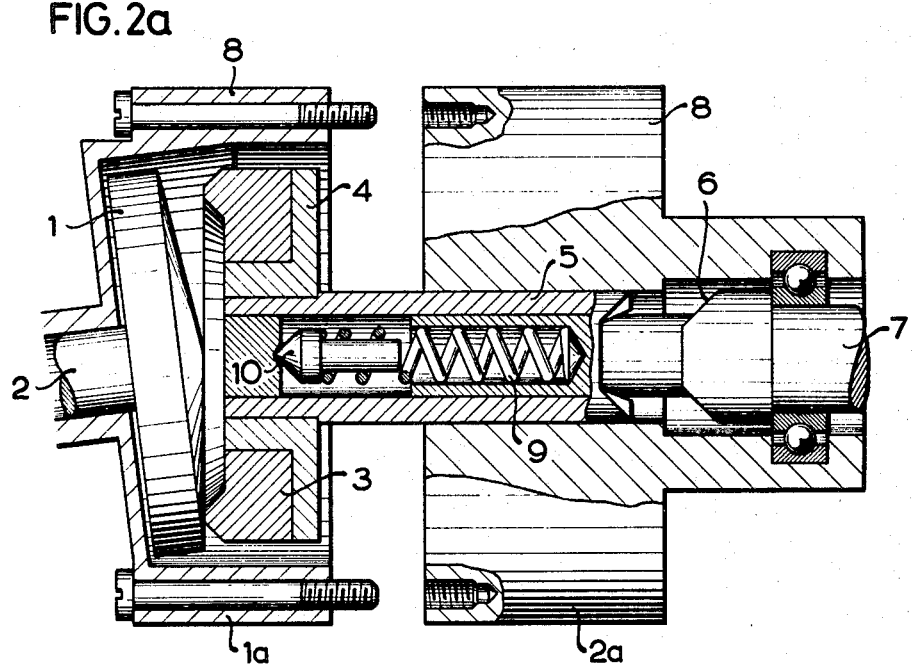

A known embodiment and two illustrative embodiments of the invention are shown on the drawing, in which FIGS. 1a and 2a are longitudinal sectional views showing a known embodiment in operation and in an open condition, FIGS. 1 and 2 are longitudinal sectional views showing a friction transmission according to the invention before and after wear of the friction ring has occurred.

Figure 3:
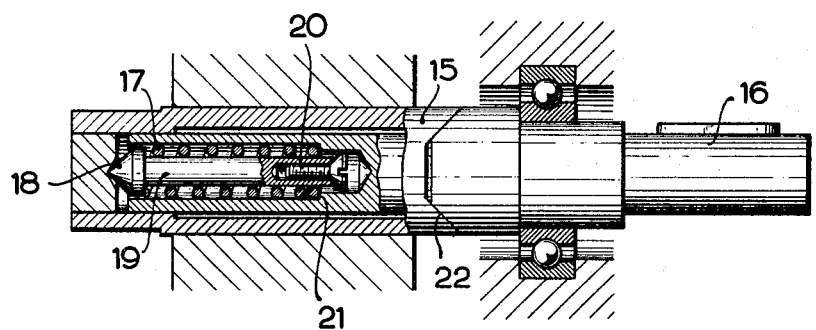
Figure 4:
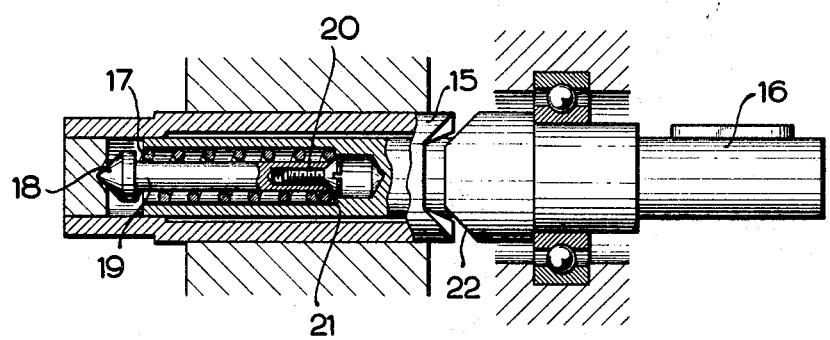

FIGS. 3 and 4 are longitudinal sectional views showing another embodiment.

FIGS. 1a and 2a show a known embodiment of a friction transmission of the type with which the invention is concerned. An embodiment of the invention is shown in FIGS. 1 and 2. According to the invention, the extension of the compression spring is limited to the extent which is functionally required. The spring is mounted under initial stress in a hollow transmission shaft. In the known embodiment, the extension of the spring was not limited. According to FIGS. 1a and 2a and FIGS. 1 and 2 a friction cone 1 is mounted directly on the motor shaft 2. Opposite the friction cone 1, a replaceable friction ring 3 is mounted by a flange 4 on a hollow stub shaft 5, which is mounted to float in an axial direction. The axial floating enables an adjustment of the length in accordance with the wear of the friction ring 3. At one end of shaft 5 is a two-way claw coupling 6. A coupled output shaft 7 is mounted in axially non-displaceable relation in the housing part 8. A compression spring 9 mounted in the shaft stub 5 carries at its forward end a pointed pressure applying member 10. FIGS. 1a and 2a show the known design, without means for limiting the extension of the spring, in the operating condition and during assembly. In the position shown in FIG. 1, where the transmission is provided with a new friction ring 3, the claw coupling elements 6 are very close to each other. According to FIG. 2, in which the friction ring 3 is worn, the coupling members are spaced apart and the compression spring has reached its limited end position. In the known embodiment shown in FIGS. 1a and 2a, the spring 9 tends to force the housing parts apart during assembly and during an exchange of the friction ring 3. This is no longer the case according to the invention, as is shown in FIGS. 1 and 2.

In the condition shown in FIG. 1, when a new friction ring 3 has been provided, a conical shoulder 11 of this ring 3 is spaced from the spring ring 13, which is arranged in the wide annular groove 12. The predetermined spacing is selected to correspond to the allowable axial wear of the friction ring 1. When the ring has worn to a maximum extent, as is shown in FIG. 2, the conical shoulder 11 of the pointed pressure applying member 10 engages the spring ring 13 so that the pressure action is discontinued and the compression spring 9 cannot extend further. The pointed pressure applying member 10 acts in any case through the socket member 14 on the hollow shaft 5. The length of the coupling claws 6 is selected to prevent a chafing or uncoupling even when the friction ring 3 has become worn. Chafing of the coupling claws would destroy themselves because the differential speeds are very high. When the spring pressure is discontinued, the contact or the required initial pressure between the friction cone 1 and the friction ring 3 is discontinued so that the transmission shaft remains at a standstill when the motor is started. In this way, an indication is furnished that the friction ring must be exchanged whereas damage to other members of the transmission is avoided.

FIGS. 3 and 4 show a further embodiment of a prestressed compression spring. In this case, only a stub shaft 15, an end shaft 16 and a means for mounting the compression spring 17 are shown. The shank 19 of the pointed pressure applying member 18 extends throughout the length of the compression spring 17 and the latter is held on this shank under initial stress by means of a screw 20, or a circlip or the like, FIG. 3 shows the condition which is obtained when the friction ring is new and FIG. 4 shows the condition obtained with a worn friction ring, as in FIG. 2. The spring end 17 engages a shoulder 21 of the spring-receiving bore formed in the transmission shaft.

Under the initial stress which is generated as the housing is being closed, the head of the screw is moved from the spring end by a distance which corresponds to the allowable axial wear of the friction ring. When this friction ring has become worn, the pressure action is discontinued as soon as the spring end engages the stop. The exchange of the friction ring is then just as simple as in the first embodiment. As in the first embodiment, a claw coupling 22 is provided at one end and a friction cone, not shown, is provided on the motor side.

A further important advantage of the means provided according to the invention for limiting the spring pressure resides in that the transmission housing can be safely opened when the housing screws can be screwed to a depth which is somewhat larger than the allowable axial wear of the ring, and in this case the housing screws can easily be threaded to a sufficient depth when it is desired to close the housing. During the tightening of the housing, the compression spring can easily be prestressed without tools or a helper, as was required in the known embodiment shown in FIGS. 1a and 2a.

What is claimed is:

1. A friction transmission, which comprises a housing, an input shaft axially nonmovably and rotatably mounted in said housing, an intermediate shaft axially movably and rotatably mounted in said housing, an output shaft axially nonmovably and rotatably mounted in said housing, and coupled to said intermediate shaft, a friction cone secured to said input shaft in said housing, a conical friction ring secured to said intermediate shaft in said housing and engaging said friction cone, prestressed compression spring means mounted in said housing and arranged to urge said friction ring against said cone and adapted to extend in response to wear of said friction ring, and stop means mounted in said housing and arranged to limit the extension of said spring means to a value corresponding to the maximum allowable axial wear of said friction ring, and to hold said spring means in the position of limited extension.

2. A friction transmission as set forth in claim 1, which comprises a claw coupling interposed between said intermediate and output shafts and adapted to apply a load-dependent thrust on said intermediate shaft.

3. A friction transmission as set forth in claim 1, in which said housing comprises two detachable parts, said input shaft being mounted in one of said parts and said intermediate and output shafts being mounted in the other of said parts.

4. A friction transmission as set forth in claim 3, in which one of said housing parts is formed with tapped bores and the other of said housing parts is formed with holes in registry with said bores, and screws extending through said holes and threaded into said bores for a length which exceeds said maximum allowable axial wear.

5. A friction transmission as set forth in claim 1, in which said intermediate shaft is hollow, said output shaft having an extension extending into said intermediate shaft, said transmission comprising a pointed pressure applying member arranged in said intermediate shaft to transmit stress from said spring means to said friction ring and to engage said stop means after a movement of said member corresponding to said maximum allowable axial wear of said friction ring.

6. A friction transmission as set forth in claim 5, in which said pressure applying member has a conical shoulder and said stop means comprises a portion of said extension which is formed with an undercut annular groove and a spring ring mounted in said groove.

7. A friction transmission as set forth in claim 1, in which said intermediate shaft is hollow, said output shaft having an extension extending into said intermediate shaft, said transmission comprising a pointed pressure applying member arranged in said intermediate shaft to transmit stress from said spring means to said friction ring, said pressure applying member having a shank which is surrounded by said spring means and carries said stop means.

8. A friction transmission as set forth in claim 7, in which said stop means comprises a screw, which is threaded into the end of said shank remote from said friction ring and has a head radially protruding beyond said shank.

References Cited
UNITED STATES PATENTS

| | | | |
|---|---|---|---|
| 1,256,947 | 2/1918 | Stampen | 64—30 |
| 2,570,493 | 10/1951 | Schmidt | 74—191 |
| 2,818,740 | 1/1958 | Wuertz | 74—191 |
| 2,842,001 | 7/1958 | Hunting | 74—191 |

C. J. HUSAR, *Primary Examiner.*